United States Patent [19]

Fenton

[11] 4,243,648

[45] Jan. 6, 1981

[54] METHOD FOR REMOVING HYDROGEN SULFIDE FROM GAS STREAMS

[75] Inventor: Donald M. Fenton, Anaheim, Calif.

[73] Assignee: Union Oil Company of California, Brea, Calif.

[21] Appl. No.: 50,170

[22] Filed: Jun. 20, 1979

[51] Int. Cl.³ .............................................. C01B 17/04
[52] U.S. Cl. ................................. 423/573 R; 423/571; 423/578 R
[58] Field of Search ............... 423/226, 571, 573, 578; 23/308 S

[56] References Cited

U.S. PATENT DOCUMENTS

| | | | |
|---|---|---|---|
| 2,468,701 | 4/1949 | Cauley | 423/573 X |
| 3,077,488 | 2/1963 | Mercier et al. | 423/573 X |
| 3,975,508 | 8/1976 | Richardson et al. | 423/573 X |
| 4,017,594 | 4/1977 | Fenton et al. | 423/573 |
| 4,125,597 | 11/1978 | Fleck | 423/573 |

FOREIGN PATENT DOCUMENTS 802384 10/1950 United Kingdom ..................... 423/578

*Primary Examiner*—G. O. Peters
*Attorney, Agent, or Firm*—Dean Sandford; Daniel R. Farrell

[57] ABSTRACT

A hydrogen sulfide removal and conversion method in which a hydrogen sulfide-containing gas stream is contacted with a regenerable washing solution capable of absorbing the hydrogen sulfide and converting the hydrogen sulfide to hydrophobic elemental sulfur particles. After oxidative regeneration of the washing solution, the sulfur particles are transferred to a nonaqueous carrier liquid to thereby form a substantially nonaqueous sulfur slurry which is then heated to melt the sulfur and form a dense liquid sulfur product which separates by gravity from the carrier liquid.

20 Claims, 1 Drawing Figure

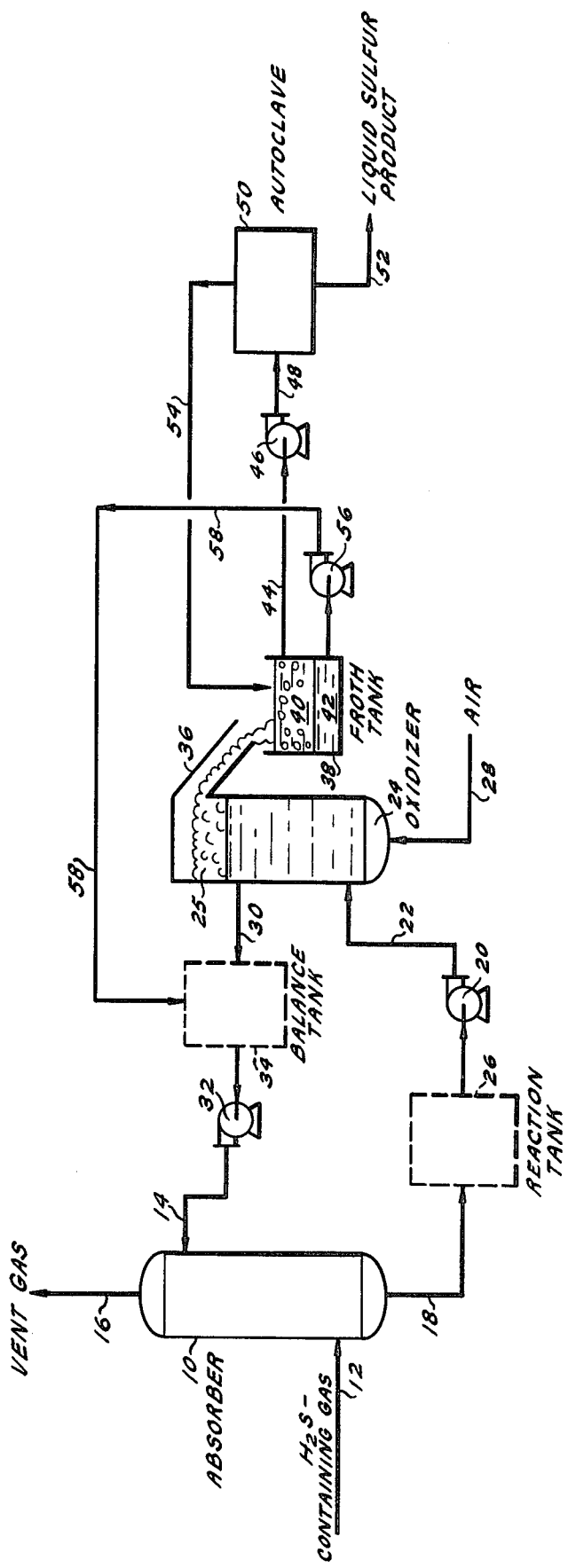

METHOD FOR REMOVING HYDROGEN SULFIDE FROM GAS STREAMS

BACKGROUND OF THE INVENTION

1. Field of the Invention

This invention relates to the removal of hydrogen sulfide from gas streams by contacting the gas with an aqueous washing solution, and more particularly to an improved method for the removal of hydrogen sulfide from gas streams in which the undesirable formation of water-soluble sulfur-containing salts and the undesirable chemical consumption of the constituents of the washing solution are substantially reduced.

2. Description of the Prior Art

With the increasing concern over the pollution of the atmosphere, great demands have been made on industry to produce pollution-free products in a pollution-free manner. One area of particular concern has been the release of sulfur and its compounds into the atmosphere as a result of the refining of petroleum, the sweetening of sour natural gas, the processing of ores, the destructive distillation of coal and/or oil shale, the gasification or liquefaction of coal, the use of geothermal fluids to generate electricity, or other processes which produce hydrogen sulfide-containing gases.

Various processes have been employed to remove hydrogen sulfide from gas streams. The Stretford process and the Takahax process employ aqueous alkaline washing solutions to absorb the hydrogen sulfide from the gas stream and to convert the absorbed hydrogen sulfide to elemental sulfur. Various methods have been used to separate the produced sulfur from the washing solution, including (1) direct-autoclaving in which an aqueous slurry comprised of sulfur and the washing solution is fed directly to an autoclave, and (2) indirect-autoclaving in which the washing solution is initially separated from the sulfur product by filtration or the like and the resulting sulfur cake is reslurried with water for introduction into an autoclave. In the autoclave, the aqueous sulfur slurries are heated to melt the sulfur and form dense liquid sulfur which separates from the aqueous carrier liquid by gravity.

While these processes are successful in substantially reducing the hydrogen sulfide content of the gas streams being treated, several problems exist which tend to increase their operating expenses. One such problem involves the chemical consumption of the washing solution constituents. The cost of chemicals required to replenish the supply of these consumable constituents adds significantly to the cost of the process. Another of the problems involves the undesirable conversion of the absorbed hydrogen sulfide and/or the product sulfur to water-soluble sulfur-containing salts, such as sulfates, thiosulfates and polythionates, which accumulate in the washing solution. These accumulated salts tend to (1) increase the corrosivity of the washing solution, (2) cause precipitation of the desired constituents of the washing solution and (3) increase the rate of chemical consumption of the alkaline constituents of the washing solution.

In commercial plants employing these processes, attempts have been made to mitigate these problems either by periodic replacement of the washing solution or by intermittently or continuously bleeding a slipstream of the contaminated washing solution while adding make-up chemicals to replenish the circulating solution. Both procedures are unsatisfactory due to the expense of the make-up chemicals and the difficulty involved in disposal of the contaminated solution.

Recent modifications of the washing solutions employed to treat hydrogen sulfide-containing gas streams have resulted in a substantial reduction or elimination of the aforementioned problems when the product sulfur is separated from the washing solution by means other than autoclaving with recycle of the aqueous autoclave effluent. When an autoclave is used, however, the aqueous slurry fed into the autoclave usually contains some constituents of the washing solution, such as vanadium, a quinone and/or alkaline constituents, which tend to catalyze the reverse Claus reaction whereby elemental sulfur is converted to water-soluble sulfur-containing salts, such as thiosulfates and polythionates. Colloidal vanadium may also be formed in the autoclave. Colloidal vanadium and sulfur-containing salts in the recycled aqueous autoclave effluent tend to reduce the efficiency of the washing solution.

While these problems associated with the use of an autoclave often render it impractical to use direct-autoclaving, and in some cases even indirect-autoclaving, the use of an autoclave is attractive from an operational standpoint because autoclaves generally require less operator attention and maintenance than a filter, a centrifuge or the like which would otherwise be employed. Thus a need exists for a hydrogen sulfide removal and conversion method employing an autoclave while avoiding the aforementioned problems.

Accordingly, a primary object of this invention is to provide a method for removing hydrogen sulfide from gas streams wherein a liquid sulfur product is recovered using an autoclave while avoiding the problems heretofore associated with the use of an autoclave.

Another object of this invention is to provide a hydrogen sulfide removal method in which the hydrogen sulfide content of the gas being treated is reduced to an acceptably low level at a reasonable cost.

Still another object of this invention is to provide a method for removing hydrogen sulfide from gas streams in which the absorbed hydrogen sulfide is converted substantially exclusively to sulfur and wherein the undesirable conversion of hydrogen sulfide and/or the product sulfur to water-soluble sulfur-containing salts is substantially reduced or eliminated.

Yet another object of this invention is to provide a method in which hydrogen sulfide is absorbed from a gas stream by a regenerable washing solution and in which the chemical consumption of the washing solution constituents is substantially reduced or eliminated.

A further object of this invention is to provide a hydrogen sulfide removal and conversion method employing an autoclave to recover a liquid sulfur product, which method avoids the undesirable formation of chemical species which are detrimental to the efficiency of the washing solution.

Still further objects, advantages and features of the invention will become apparent to those skilled in the art from the following description when taken in conjunction with the accompanying drawing.

SUMMARY OF THE INVENTION

Briefly, the invention provides a hydrogen sulfide removal and conversion method in which a hydrogen sulfide-containing gas stream is contacted with a regenerable aqueous washing solution capable of absorbing the hydrogen sulfide and converting the absorbed hydrogen sulfide to hydrophobic elemental sulfur particles by reaction with constituents of the washing solution. After oxidative regeneration of the washing solution, the sulfur is transferred to a nonaqueous carrier liquid to thereby form a substantially nonaqueous sulfur slurry which is substantially free of the aqueous washing solution constituents. The sulfur slurry is then heated to melt the sulfur and form a dense liquid sulfur product which separates by gravity from the carrier liquid. The operating conditions and washing solution composition employed in the method of this invention are selected such that hydrophobic sulfur particles are formed.

In a preferred embodiment of the method of this invention the washing solution is an aqueous solution having a pH between about 5 and about 10 and containing (1) solubilized vanadium, (2) thiocyanate ions, (3) a solubilizing agent capable of solubilizing tetravalent vanadium and (4) a water-soluble carboxylate complexing agent.

The method of this invention allows the use of an autoclave to recover a liquid sulfur product while avoiding all the problems heretofore associated with the use of an autoclave. The method of this invention produces hydrophobic sulfur particles which are readily transferable from the aqueous washing solution to a nonaqueous carrier liquid. The use of a nonaqueous carrier fluid to transport the sulfur particles to an autoclave for melting in the method of this invention avoids the problems associated with the heating of an aqueous washing solution in an autoclave. The use of the method of this invention substantially eliminates the undesirable formation of chemical species, such as colloidal vanadium and thiosulfate salts, which would otherwise adversely affect the efficiency of the washing solution.

BRIEF DESCRIPTION OF THE DRAWING

The invention will be more readily understood by reference to the drawing which is a schematic flow diagram illustrating the manner in which a hydrogen sulfide-containing gas is treated by one embodiment of the method of this invention.

DETAILED DESCRIPTION OF THE INVENTION

The method of this invention is suitable for removing hydrogen sulfide from a wide variety of hydrogen sulfide-containing gas streams, including hydrogen sulfide-containing gas streams generated as a result of the refining of petroleum, the sweetening of sour natural gas, the processing of ores, the destructive distillation of coal and/or oil shale, the gasification or liquefaction of coal, the use of geothermal fluids to generate electricity, or other processes which produce hydrogen sulfide-containing gases. The method of this invention can successfully treat gas streams containing less than one mole percent hydrogen sulfide as well as gas streams containing up to 80 mole percent hydrogen sulfide or more. One such hydrogen sulfide-containing gas stream is the gas produced by hydrogenation and hydrolysis of a Claus process tail gas as disclosed in U.S. Pat. No. 3,752,877 to Beavon, the disclosure of which is herein incorporated by reference. Hydrogenated Claus process tail gas typically contains from about 0.5 to about 5 mole percent hydrogen sulfide, from about 2 to about 15 mole percent carbon dioxide, from about 5 to about 30 mole percent water and traces of methane, carbonyl sulfide and methyl mercaptan, with the remainder being nitrogen.

The drawing schematically illustrates the process equipment employed in one embodiment of the method of this invention. The hydrogen sulfide-containing gas is introduced through conduit 12 into the bottom of absorber 10 and flows upwardly through absorber 10 in countercurrent contact with a washing solution introduced through conduit 14 into the top of absorber 10. Substantially all of the hydrogen sulfide is absorbed from the gas by the downwardly flowing solution to thereby form a vent gas which is substantially free of hydrogen sulfide. The vent gas is discharged through conduit 16 to the atmosphere. While an absorber employing countercurrent flow of the hydrogen sulfide-containing gas and the washing solution has been described, other known gas/liquid contacting vessels, such as a venturi scrubber employing cocurrent flow of the gas and washing solution, may be successfully employing in the method of this invention. Suitable gas/liquid scrubbers include single and multistage contacting vessels using countercurrent and/or cocurrent flow of the gas stream and the washing solution.

Once absorbed by the washing solution, the hydrogen sulfide is oxidatively converted to elemental sulfur by reaction with the constituents of the washing solution. The reduced washing solution and entrained elemental sulfur are withdrawn from absorber 10 via conduit 18 and are pumped by pump 20 through conduit 22 into the bottom of oxidizer 24. Prior to introduction of the reduced solution into oxidizer 24, sufficient time should be allowed for complete conversion of the absorbed hydrogen sulfide to elemental sulfur. Typically this conversion is completed in above five minutes and sufficient residence time can be provided by briefly holding the reduced solution in the bottom of absorber 10. Optionally, reaction tank 26 is provided between absorber 10 and oxidizer 24, if required, in order to allow sufficient reaction time for the complete conversion of the absorbed hydrogen sulfide to elemental sulfur.

The reduced washing solution and entrained sulfur introduced through conduit 22 into oxidizer 24 are contacted with air, or other molecular oxygen-containing gas, which is introduced through conduit 28 into the bottom of oxidizer 24. The entering air is preferably churned into small bubbles by a submerged rotating stirrer, not shown, adapted for this purpose. The reduced washing solution is oxidixed by reaction with oxygen thereby regenerating the constituents of the washing solution. The air also serves to float the sulfur particles entering oxidizer 24 and thereby form an aqueous sulfur froth 25 at the top of oxidizer 24. The regenerated washing solution is withdrawn from oxidizer 24 via conduit 30 and is recycled by pump 32 through conduit 14 to the top of absorber 10. Optionally, balance tank 34 is provided as an accumulator or surge tank for the regenerated washing solution. The aqueous sulfur froth, which contains from about 3 to about 20 weight percent of elemental sulfur as well as entrained air and washing solution, overflows from oxidizer 24 through conduit 36 into froth tank 38.

Froth tank 38 contains upper liquid layer 40 comprised of a nonaqueous carrier liquid and floating sulfur particles, and lower liquid layer 42 comprised of aqueous washing solution which has drained from the sulfur froth. As the sulfur froth from oxidizer 24 drops from conduit 36 into froth tank 38, the hydrophobic sulfur particles are caught up and float in the nonaqueous carrier liquid. The aqueous washing solution contained in the sulfur froth drains by gravity through upper layer 40 into aqueous layer 42. A mechanical stirrer or the like, not shown, may be provided in order to gently agitate the contents of froth tank 38. Gentle agitation tends to aid in the flotation of the sulfur particles and enhances the drainage of washing solution from the sulfur particles. In any event, froth tank 38 is adapted to transfer the hydrophobic sulfur particles from the aqueous sulfur froth to the nonaqueous carrier liquid so as to produce a substantially nonaqueous sulfur slurry in layer 40 and sulfur-free washing solution in layer 42.

The washing solution is withdrawn from froth tank 38 by pump 56 and is recycled through conduit 58 to the circulating washing solution, such as by recycle to balance tank 34 or conduit 14. The substantially nonaqueous sulfur slurry is withdrawn from froth tank 38 via conduit 44, such as by pump 46 or by gravity flow over a weir, not shown, and is conducted through conduit 48 into autoclave 50. In autoclave 50 the sulfur slurry is heated sufficiently to melt the sulfur particles and thereby form a dense liquid sulfur product which separates by gravity from the carrier liquid. The liquid sulfur product is withdrawn from autoclave 50 via conduit 52 and transferred to storage or the like. The carrier liquid is withdrawn from autoclave 50 and is recycled through conduit 54 to froth tank 38. Optionally the carrier liquid in conduit 54 may be cooled, such as by heat exchange with the nonaqueous slurry in conduit 48, prior to introduction into froth tank 38.

Preferably the carrier liquid employed in the method of this invention is a nonaqueous liquid which is immiscible with the aqueous washing solution and has a lower specific gravity than the aqueous washing solution. In one preferred embodiment of the method of this invention, the carrier liquid is a hydrocarbon liquid which has a specific gravity less than about 1.0 and which is relatively insoluble in the aqueous washing solution. Suitable carrier liquids include relatively pure hydrocarbons as well as hydrocarbon mixtures, and the carrier liquid may have a boiling point which is above, the same as, or below the melting point of elemental sulfur. Where the carrier liquid has a boiling point which is the same as, or below the temperature in the autoclave, the carrier liquid will be at least partially vaporized in the autoclave and the vapor should be condensed prior to recycling the same to the froth tank. Preferably the carrier liquid has a boiling point above the temperature employed in the autoclave, such as above about 300° F., so that the amount of the carrier liquid vaporized in the autoclave is minimized. Where the carrier fluid is a mixture of fluids having a range of boiling points it is preferred that the initial boiling point of the carrier liquid be above the temperatures employed in the autoclave. Autoclave 50 may be operated at a superatmospheric pressure in order to prohibit vaporization of the carrier liquid. Suitable hydrocarbon carrier liquids include refinery product streams having initial boiling points above about 300° F. which are relatively free of surface active components, such as diesel fuel and turbine fuel, and commercially available solvents, such as decane, cyclohexane and toluene. Aliphatic hydrocarbon liquids, such as saturated $C_8$ to $C_{20}$ hydrocarbons are preferred, particularly the $C_{10}$ to $C_{15}$ alkanes having boiling points above about 300° F.

The washing solution employed in the method of this invention must be capable of absorbing hydrogen sulfide from the gas stream being treated and converting the absorbed hydrogen sulfide to elemental sulfur such that hydrophobic sulfur particles are produced. Washing solutions which allow conversion of the absorbed hydrogen sulfide to sulfite ions are not suitable because sulfite ions react with the elemental sulfur particles to form ligands, such as thiosulfate ligands, on the surface of the sulfur particles. Such ligands render the particles more hydrophilic.

In addition, the operating conditions employed in the method of this invention must be selected to allow the formation of hydrophobic sulfur particles. Operating conditions which tend to produce sulfite ions or the like, such as a prolonged overloading of the washing solution, should be avoided. Suitable washing solutions and operating conditions will become evident to those skilled in the art from this disclosure and the examples.

In a preferred embodiment of the method of this invention, the washing solution introduced into contact with the hydrogen sulfide-containing gas stream is an aqueous solution having a pH between about 5 and about 10 and containing (1) solubilized vanadium, (2) thiocyanate ions, (3) a solubilizing agent capable of solubilizing tetravalent vanadium, and (4) a water-soluble carboxylate complexing agent. Preferably the solubilized vanadium is provided by dissolving a water-soluble vanadium-containing compound in the washing solution. Suitable vanadium-containing compounds include the alkali metal and ammonium vanadate salts, such as sodium metavanadate, sodium orthovanadate, sodium pyrovanadate, sodium ammonium vanadate and isopolyvanadate. The concentration of vanadium in the washing solution, calculated in terms of grams of elemental vanadium per liter of solution, is between about 0.3 and about 20 grams of vanadium per liter, preferably between about 0.5 and about 10 grams of vanadium per liter. In terms of gram-moles of vanadium per liter of solution, the corresponding concentrations are between about 0.006 and about 0.4 gram-moles of vanadium per liter, preferably between about 0.01 and about 0.2 gram-moles of vanadium per liter. Good results are obtained when the solution contains between about 2 grams (0.04 gram-moles) and about 8 grams (0.16 gram-moles) of vanadium per liter.

The thiocyanate ions in the washing solution are provided by dissolving a water-soluble thiocyanate salt, such as an alkali metal or ammonium thiocyanate, in the washing solution. Alternatively, one or more "thiocyanate ion precursors", such as an alkali metal or ammonium cyanide, may be dissolved in the washing solution and thereafter converted to thiocyanate ions by reaction with absorbed hydrogen sulfide. However, at least for the initial formulation of the washing solution it is preferred that an alkali metal or ammonium thiocyanate be dissolved in the washing solution to provide the thiocyanate ions. Calculated as grams of thiocyanate ion ($SCN^-$) per liter of solution, the washing solution contains between about 5 and about 400 grams of thiocyanate ions per liter, preferably between about 30 and about 150 grams of thiocyanate ions per liter. Good results are obtained when the washing solution contains between about 50 and about 75 grams of thiocyanate ions per liter.

The washing solution also contains a solubilizing agent capable of solubilizing tetravalent vanadium, i.e., vanadium having a plus-four valence, which could otherwise precipitate from the reduced washing solution. Suitable solubilizing agents include both organic and inorganic solubilizing agents. Preferred solubilizing agents are the water-soluble aromatic compounds capable of solubilizing tetravalent vanadium, such as the water-soluble aromatic sulfonates. The water-soluble hydroxyaromatic sulfonates are particularly preferred.

Suitable water-soluble aromatic compounds include compounds which will be present in the washing solution as a quinone, such as the alkali metal and ammonium salts and the acids of the 9,10-anthraquinone-x,y-disulfonates (wherein x=1 or 2, and y=5,6,7 or 8) and 1,4-naphthaquinone-2-sulfonate. Water-soluble nonquinone aromatic compounds are also suitable, including the alkali metal and ammonium salts and the acids of 1-hydroxybenzene-4-sulfonate; 1,4-dihydroxybenzene-2-sulfonate; the 1,4-dihydroxybenzene-2,x-disulfonates (wherein x=5 or 6); 4,5-dihydroxynaphthalene-2,7-disulfonate; pyridine-3-sulfonate; and 8-hydroxyquinoline-5-sulfonate. Mixtures of the solubilizing agents can also be employed.

The concentration of the solubilizing agent is selected in view of, inter alia, the sulfur-loading of the washing solution, the solubility of the solubilizing agent and the vanadium concentration in the solution. The washing solution contains between about 0.001 and about 0.25 gram-moles of the solubilizing agent per liter. The concentration of the solubilizing agent in a quinone-containing washing solution is preferably between about 0.001 and about 0.04 gram-moles of the solubilizing agent per liter, more preferably from about 0.0015 to about 0.015 gram-moles per liter. When the washing solution is substantially free of quinones, the preferred concentration is between about 0.01 and about 0.25 gram-moles of solubilizing agent per liter, more preferably between about 0.02 and about 0.15 gram-moles per liter.

The carboxylate complexing agent contained in the washing solution of this invention serves to maintain the solubility of vanadium in the presence of thiocyanate ions. The carboxylate complexing agent preferably has at least two water-solubilizing groups, at least one of which is a carboxyl group. Preferably, the complexing agent contains at least one carboxyl group and at least one hydroxy group. Suitable carboxylate complexing agents include the water-soluble polycarboxylic acids and their salts, such as maleic acid, particularly those polycarboxylic acids and salts having at least one hydroxy group, such as citric acid, malic acid and/or tartaric acid, and the monohydroxy- or polyhydroxy monocarboxylic acids and their salts, such as glycolic acid. Citric acid and its water-soluble salts are particularly preferred carboxylate complexing agents.

The washing solution preferred for use in the method of this invention has a pH between about 5 and about 10, more preferably between about 7 and about 9.5. Good results are obtained when the washing solution has a pH between about 8 and about 9. The washing solution can be buffered at the desired pH by the use of conventional buffering agents, such as a weak carboxylic acid and an alkali metal or ammonium salt of the weak carboxylic acid. Alternatively, or in addition, the pH of the washing solution can be controlled by the addition of weak acids, such as carbon dioxide absorbed from the gas stream, and/or a base, such as sodium hydroxide. The alkali metal and ammonium carbonates and bicarbonates are preferred buffering agents, particularly mixtures of the alkali metal carbonates and bicarbonates. An exemplary washing solution has a pH between about 8 and about 9, and contains between about 5 and 10 grams of sodium carbonate per liter, between about 25 and about 30 grams of sodium bicarbonate per liter, and between about 10 and about 20 grams of sodium citrate per liter.

The use of the above-described washing solutions in the method of this invention results in the conversion of the absorbed hydrogen sulfide to hydrophobic elemental sulfur particles which are readily transferred to the nonaqueous carrier liquid, such as by contact of the aqueous sulfur froth overflowing from oxidizer 24 with the carrier liquid in froth tank 38. Of course, other methods of transferring the sulfur particles to the nonaqueous sulfur froth can be employed.

Because the method of this invention effectively precludes the introduction of the washing solution and its constituents into the autoclave, the problems associated with their presence in an autoclave are avoided.

The invention is further illustrated by the following examples which are illustrative of specific modes of practicing the invention and are not intended as limiting the scope of the appended claims.

EXAMPLES 1–3

Hydrogen sulfide is removed from a hydrogen sulfide-containing gas stream by contact with a regenerable washing solution in accordance with the method of this invention and substantially in accordance with the flow diagram illustrated in the drawing. In each example the gas stream which contains about 3 mole percent of hydrogen sulfide, about 36 mole percent of carbon dioxide and about 61 mole percent of nitrogen is counter-currently contacted with a washing solution having a composition indicated in the Table below. The absorbed hydrogen sulfide is converted to hydrophobic elemental sulfur particles by reaction with constituents of the washing solution, and the washing solution is oxidatively regenerated in oxidizer 24. The regenerated washing solution from oxidizer 24 is recycled to absorber 10, and an aqueous sulfur froth flows through conduit 36 into froth tank 38 which contains a body of a nonaqueous carrier liquid floating on a body of washing solution. The carrier liquid employed is n-decane.

In froth tank 38, the hydrophobic sulfur particles are transferred to the carrier liquid to form a substantially water-free sulfur slurry which is then conducted to autoclave 50 for heating. Upon heating to about 260° F. the sulfur particles melt and the liquid sulfur thus formed separates by gravity from the carrier liquid. The liquid sulfur product is recovered for sale and the separated carrier liquid is recycled to froth tank 38.

TABLE

| Constituent Concentrations | Example | | |
|---|---|---|---|
| (grams per liter) | 1 | 2 | 3 |
| Vanadium | 5.5 | 5.9 | 5.2 |
| Sodium Thiocyanate | 75 | 82 | 80 |
| Solubilizing Agent | 1.9[b] | 17[c] | 8[d] |
| Sodium Citrate | 16 | 20 | 12 |
| Sodium Carbonate Equivalent[a] | 26 | 27 | 28 |

[a]"Sodium Carbonate Equivalent equals the sodium carbonate concentration plus 0.631 times the sodium bicarbonate concentration.
[b]The solubilizing agent is the disodium salt of 9,10-anthraquinone-2,7-disulfonic acid.
[c]The solubilizing agent is the sodium salt of 1-hydroxybenzene-4-sulfonic acid.
[d]The solubilizing agent is the sodium salt of 8-hydroxyquinoline-5-sulfonic acid.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. A method for removing hydrogen sulfide from a hydrogen sulfide-containing gas stream and converting said hydrogen sulfide to elemental sulfur, which comprises:
   (a) contacting said gas stream with an aqueous regenerable washing solution capable of converting absorbed hydrogen sulfide to hydrophobic sulfur particles, said contacting being conducted under conditions selected to absorb said hydrogen sulfide into said washing solution and to convert the absorbed hydrogen sulfide substantially exclusively to hydrophobic elemental sulfur particles;
   (b) allowing said absorbed hydrogen sulfide to react with the constituents of said washing solution to thereby form said sulfur particles;
   (c) oxidatively regenerating the washing solution from step (b) to form a regenerated washing solution;
   (d) transferring said hydrophobic sulfur particles from said washing solution to a nonaqueous carrier liquid so as to form a substantially nonaqueous sulfur slurry comprised of said sulfur particles entrained in said carrier liquid; and
   (e) heating said sulfur slurry so as to melt said sulfur particles and thereby form a liquid elemental sulfur product.

2. The method defined in claim 1 further comprising the steps of (f) separating said sulfur product from said carrier liquid and (g) recycling the separated carrier liquid for reuse in step (d).

3. The method defined in claim 1 wherein said carrier liquid is a hydrocarbon liquid which has a specific gravity less than about 1.0 and which is immiscible with and substantially insoluble in said washing solution.

4. The method defined in claim 3 wherein said hydrocarbon liquid has an initial boiling point at atmospheric pressure above about 300° F.

5. The method defined in claim 3 wherein the transfer of said hydrohobic sulfur particles in step (d) is accomplished by contacting said carrier liquid with an aqueous sulfur froth comprised of said hydrophobic sulfur particles and at least a portion of said regenerated washing solution.

6. The method defined in claim 1 wherein said washing solution comprises an aqueous solution having a pH between about 5 and about 10 and containing (1) solubilized vanadium, (2) thiocyanate ions, (3) a solubilizing agent capable of solubilizing tetravalent vanadium, and (4) a water-soluble carboxylate complexing agent.

7. The method defined in claim 6 wherein said washing solution further contains a buffering agent selected from the group consisting of the alkali metal and ammonium carbonates, the alkali metal and ammonium bicarbonates, the alkali metal and ammonium salts of carboxylic acids and mixtures thereof.

8. The method defined in claim 6 wherein said carboxylate complexing agent is an alkali metal or ammonium salt of a hydroxy carboxylic acid, and wherein said washing solution further contains a buffering agent selected from the group consisting of the alkali metal carbonates, the alkali metal bicarbonates and mixtures thereof.

9. The method defined in claim 6 wherein said carboxylate complexing agent is an alkali metal or ammonium salt of citric acid.

10. The method defined in claim 6 wherein said solubilizing agent is an alkali metal or ammonium salt or an acid of a water-soluble aromatic compound selected from the group consisting of 1,4-naphthaquinone-2-sulfonate, the 9,10-anthraquinone-x,y-disulfonates (wherein $x = 1$ or 2, and $y = 5$, 6, 7 or 8), 1-hydroxybenzene-4-sulfonate, 1,4-dihydroxybenzene-2-sulfonate, the 1,4-dihydroxybenzene-2,x-disulfonates (wherein $x = 5$ or 6), 4,5-dihydroxynaphthalene-2,7-disulfonate, pyridine-3-sulfonate, 8-hydroxyquinoline-5-sulfonate and mixtures thereof.

11. A method for removing hydrogen sulfide from a hydrogen sulfide-containing gas stream and converting said hydrogen sulfide to elemental sulfur, which comprises:
   (a) contacting said gas stream with an aqueous regenerable washing solution comprising an aqueous solution having a pH between about 7 and about 9.5 and containing (1) between about 0.3 and about 20 grams of solubilized vanadium per liter, (2) between about 30 and about 150 grams of thiocyanate ions per liter, (3) a solubilizing agent capable of solubilizing tetravalent vanadium, and (4) a water-soluble carboxylate complexing agent, said contacting being conducted under conditions selected to absorb said hydrogen sulfide into said washing solution and to convert the absorbed hydrogen sulfide substantially exclusively to hydrophobic elemental sulfur particles;
   (b) allowing said absorbed hydrogen sulfide to react with the constituents of said washing solution to thereby form said sulfur particles;
   (c) passing an oxygen-containing gas through the washing solution from step (b) so as to oxidatively regenerate said washing solution and form an aqueous sulfur froth comprised of said sulfur particles entrained in at least a portion of the regenerated washing solution;
   (d) contacting said aqueous sulfur froth with a nonaqueous carrier liquid so as to transfer said sulfur particles from said aqueous froth to said carrier liquid and thereby form a substantially nonaqueous sulfur slurry comprised of said sulfur particles entrained in said carrier liquid, said carrier liquid being a hydrocarbon liquid which has a specific gravity less than about 1.0 and which is immiscible with and substantially insoluble in said washing solution;
   (e) recycling at least a portion of the regenerated washing solution from step (c) into contact with said gas stream in step (a);
   (f) heating said sulfur slurry so as to melt said sulfur particles and thereby form a liquid elemental sulfur product;
   (g) separating said sulfur product from said carrier liquid; and
   (h) recycling the separated carrier liquid from step (g) for reuse in step (d).

12. The method defined in claim 11 wherein said complexing agent is an alkali metal salt of a hydroxycarboxylic acid, and wherein said washing solution further contains a buffering agent selected from the group consisting of the alkali metal carbonates, the alkali metal bicarbonates and mixtures thereof.

13. The method defined in claim 11 wherein said carboxylate complexing agent is an alkali metal salt of citric acid.

14. The method defined in claim 11 wherein said solubilizing agent is an alkali metal salt of a 9,10-anthraquinone-x,y-disulfonate (wherein $x = 1$ or 2, and y=6 or 7) and wherein the concentration of said solubilizing agent is between about 0.0015 and about 0.015 gram-moles per liter.

15. The method defined in claim 11 wherein said solubilizing agent is an alkali metal salt of an aromatic sulfonate selected from the group consisting of 1-hydroxybenzene-4-sulfonate, 1,4-dihydroxybenzene-2-sulfonate, the 1,4-dihydroxybenzene-2,x-disulfonates (wherein x=5 or 6), 4,5-dihydroxynaphthalene-2,7-disulfonate, pyridine-3-sulfonate, 8-hydroxyquinoline-5-sulfonate and mixtures thereof, and wherein said washing solution is a quinone-free washing solution containing between about 0.01 and about 0.25 gram-moles of said solubilizing agent per liter.

16. A method for removing hydrogen sulfide from a hydrogen sulfide-containing gas stream and converting said hydrogen sulfide to elemental sulfur, which comprises:

(a) contacting said gas stream with an aqueous regenerable washing solution comprising an aqueous solution having a pH between about 7 and about 9.5 and containing (1) between about 0.5 and about 10 grams of solubilized vanadium per liter, (2) between about 30 and about 150 grams of thiocyanate ions per liter, (3) between about 0.001 and about 0.25 gram-moles per liter of a solubilizing agent selected from the group consisting of the 9,10-anthraquinone-2,x-disulfonates (wherein x=6 or 7), 1-hydroxybenzene-4-sulfonate, 8-hydroxyquinoline-5-sulfonate and mixtures thereof, (4) an alkali metal citrate, and (5) a buffering agent selected from the group consisting of the alkali metal carbonates, the alkali metal bicarbonates and mixtures thereof, said contacting being conducted under conditions selected to absorb substantially all of said hydrogen sulfide into said washing solution and to convert the absorbed hydrogen sulfide substantially exclusively to hydrophobic sulfur particles;

(b) allowing said absorbed hydrogen sulfide to react with the constituents of said washing solution to thereby form said sulfur particles;

(c) passing air upwardly through a body of the washing solution from step (b) so as to oxidatively regenerate said washing solution and form (1) a major sulfur-free portion of regenerated washing solution and (2) an aqueous sulfur froth comprised of said sulfur particles entrained in a minor portion of regenerated washing solution;

(d) recycling said major portion of regenerated washing solution for reuse in step (a);

(e) contacting said sulfur froth with a non-aqueous carrier liquid so as to transfer said sulfur particles from said sulfur froth to said carrier liquid and so as to allow said minor portion of regenerated washing solution to separate from said sulfur froth, thereby forming (1) a substantially nonaqueous sulfur slurry comprised of said sulfur particles entrained in said carrier liquid and (2) a sulfur-free portion of regenerated washing solution, said carrier liquid being comprised of one or more saturated aliphatic hydrocarbon liquids which have boiling points above about 300° F. and which are immiscible with and substantially insoluble in said washing solution;

(f) recycling said sulfur-free portion of regenerated washing solution from step (e) for reuse in step (a);

(g) heating said sulfur slurry so as to melt said sulfur particles and thereby form a liquid elemental sulfur product;

(h) separating said sulfur product from said carrier liquid; and (i) recycling the separated carrier liquid from step (h) for reuse in step (e).

17. The method defined in claim 16 wherein said carrier liquid comprises one or more alkanes having between about 10 and about 18 carbon atoms per molecule.

18. The method defined in claim 16 wherein said washing solution has a pH between about 8 and about 9 and contains between about 5 and about 10 grams of sodium carbonate per liter, between about 25 and about 30 grams of sodium bicarbonate per liter, and between about 10 and 20 grams of sodium citrate per liter.

19. The method defined in claim 16 or 18 wherein said solubilizing agent is an alkali metal salt of a 9,10-anthraquinone-x,y-disulfonate (wherein x=1 or 2, and y=6 or 7) and wherein the concentration of said solubilizing agent in said washing solution is between about 0.0015 and about 0.015 gram-moles per liter and the concentration of said solubilized vanadium is between about 2 and about 8 grams per liter.

20. The method defined in claim 16 or 18 wherein said solubilizing agent is an alkali metal salt of 1-hydroxybenzene-4-sulfonate, and wherein said washing solution is a quinone-free washing solution containing between about 0.02 and about 0.15 gram-moles of said solubilizing agent per liter and between about 2 and about 8 grams of said solubilized vanadium per liter.

* * * * *